March 3, 1964  YORIYUKI NIEDA  3,123,725
HALL EFFECT DYNAMOELECTRIC MACHINE
Filed March 2, 1960  3 Sheets-Sheet 1

INVENTOR.

BY

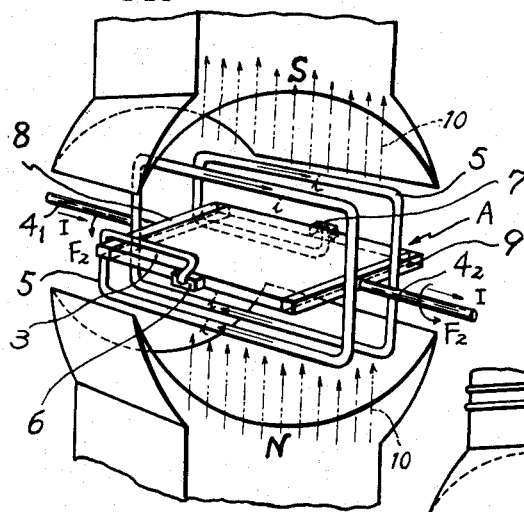
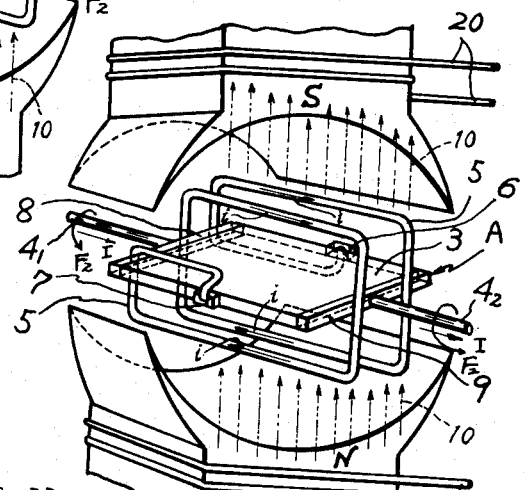
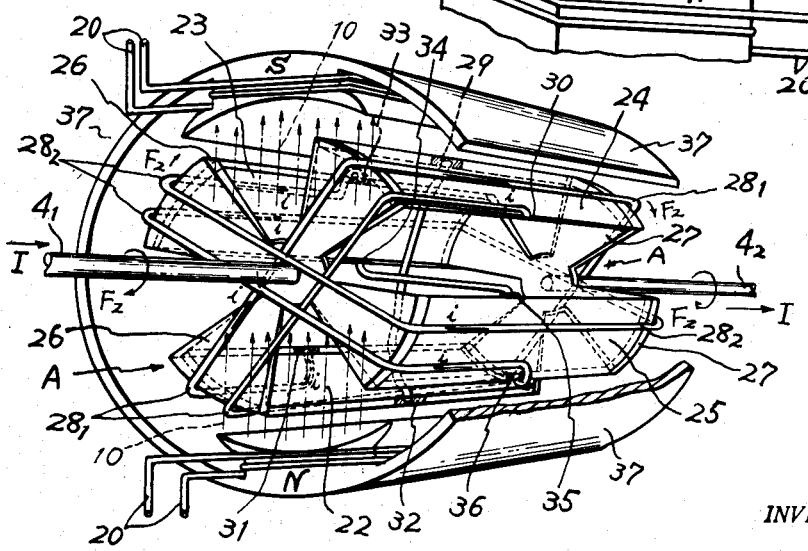

INVENTOR.

BY

United States Patent Office 3,123,725
Patented Mar. 3, 1964

3,123,725
HALL EFFECT DYNAMOELECTRIC MACHINE
Yoriyuki Nieda, 2 Matsugaoka, Kanagawa-ward,
Zushi City, Japan
Filed Mar. 2, 1960, Ser. No. 12,445
Claims priority, application Japan Mar. 30, 1959
8 Claims. (Cl. 310—2)

This invention relates to a minimum size non-commutator rotating electric machine for D.C., wherein a semi-conductor sheet acts the electrogeneration and commutator action, while rotating, and which is so composed as to generate a rotating force in proportion with the product of magnetic flux and control electric current or the in-put.

In general, in usual known electric motors or generators (or dynamos), etc., the electric waves of noisy sounds due to various electric rotating machines, because of intricate constructions of a commutator, disturb the receiving of radios, television, etc. It is, therefore, necessary to provide a noise-preventing device, etc. However, such a provision of noise-preventing device as referred to above is extraordinarily unsatisfactory at the stage where, in the rotating electric machine, a small type, a light weight and a high revolving velocity, etc. are requested.

Hence, according to the present invention, in order to satisfy the said required condition, electric current is passed in one direction across a semi-conductor plate, and then when an external magnetic field is caused to act at right angle to the direction of said electric current, an electrical potential will be generated at the perpendicular plate end due to those phenomena. By utilization of those phenomenon, it is intended to provide a rotating electric machine for D.C. and A.C., which has no commutator and is of minimum size, and which is based on an entirely different conception from that in the ordinary electric motors or generators, the essentials thereof lying in that a semi-conductor plate is placed between both magnetic poles, across said semi-conductor an electric current being passed in one direction, said semi-conductor plate being wound with coils in parallel with said direction of current and perpendicular to the surface of said semi-conductor plate, further the two ends of said coils being connected with both end members of the semi-conductor plate positioned perpendicularly to said current direction.

On the other hand, according to this invention, the following set-up is provided as a concrete construction sufficiently satisfying the said essentials of this invention, wherein a cylindrical body made of an insulating material is divided into many equal portions, for instance, in four divisions; and the four sheets of semi-conductor plates of circular section are then combined to form a cylindrical rotor, said rotor being placed at right angles to the magnetic flux. Electric current is passed across said semi-conductor plate in one direction respectively, and around two opposite sets of semi-conductor plates wound with rotating coils in parallel with the current directions referred to above and at right angles respectively to a respective face of said semi-conductor plate. The ends of each of those coils are connected to the ends of a respective semi-conductor plate positioned perpendicularly to said direction of electric current.

Thus the non-commutator, minimum size rotating dynamoelectric machine for D.C. and A.C. according to this invention does not utilize a complicated commutator as in the ordinary electric motor, electric generator, etc. and has an advantage of generating no noisy electric wave as in conventional electric rotating machines, which raise receiving disturbances in radio and television and other devices and which are difficult to remove from the receiving circuits employed.

Another advantage of this invention lies in that the responsiveness of electromotive force generated on the semi-conductor plate is $10^{-12}$ to $10^{-14}$ seconds; and as the revolving characteristic is excellent, it can be used as a high frequency rotating electric machine. As a rotor comprises a semi-conductor plate and a rotating coil, the rotating electric machine can be made in a super-smaller size: 8 mm. dia., length less than 15 mm. and extremely light weight; therefore, it can advantageously be used widely as a micromotor.

A further advantage of this invention lies in that since the device according to this invention has an advantage of generating a force always proportional to the in-put (product of the magnetic flux and controlling electric current), the device can be advantageously used as various electrical meters, such as tachometer, integrating meter, calculator, etc. in addition to that of electric motors or electric generators. Moreover, there is another advantage in this invention, in that no precision parts of a few microns is required as are requested in ordinary micromotors, and in addition it can be fabricated at a lower cost, because the semi-conductor plate can serve simultaneously to the electric generation and to the commutator and the construction is robust and simple.

In addition, the rotating electric machine according to this invention is super-small type and super-light weight, and rotates at a super-high speed. Therefore, said rotating machine can be employed as a tape-recorder, cine-projector, camera or device for automatic controlling or actuating various kinds of recording instruments, and in addition as various types of compasses, and particularly suitable for meters for rockets, aircrafts etc.

The present invention will further be detailed in the following respect to an embodiment with reference to the accompanying drawings which illustrate principles and embodiments thereof, and of which FIGURE 1 is an oblique view illustrating schematically the principle of ordinary D.C. motor;

FIGURES 3 and 4 are oblique views similar to FIGURE 2 illustrating the rotor of rotating electric machine of FIGURE 2, which rotates at different angular variations respectively;

FIGURE 5 is an oblique view showing schematically the principle of operation of a rotating electric machine, an embodiment of this invention;

FIGURE 6 is an enlarged oblique view showing a concrete construction with a part thereof being broken off of the rotating electric machine shown in FIGURE 5;

Figure 1:
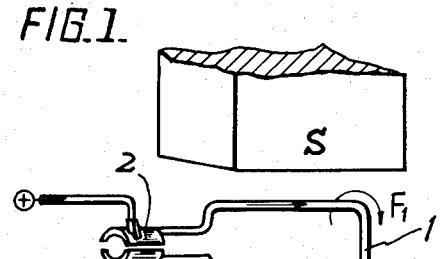
Figure 2:
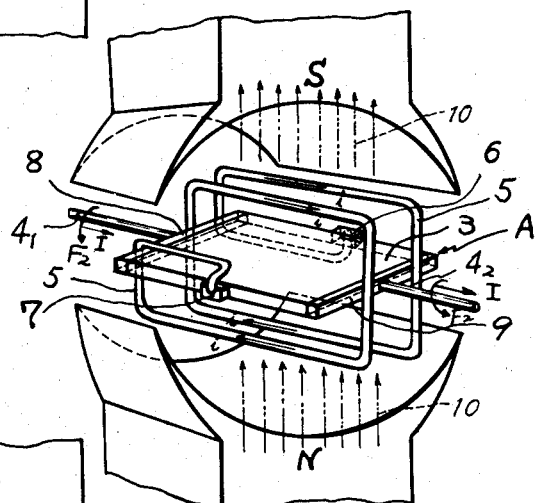
FIGURE 2 is an oblique view illustrating schematically the principle of rotating electric machine according to this invention.

The ordinary motor has a coil 1 of U shape between the N and S poles as shown in FIGURE 1, whereby D.C. current is passed through a commutator 2 to said lead wire, thereby rotating force $F_1$ being caused in said lead wire 1 by means of magnetic flux 10 between both magnetic poles and D.C. in the lead wire. In the rotating electric machine of this invention, as illustrated in FIGURE 2 there is so provided a semi-conductor plate 3 as to cut the flux between N and S poles at right angles, rotating spindles $4_1$, $4_2$ are then provided, which are formed as lead wires on opposite both end surfaces along the central axis longitudinal of said semi-conductor plate, and any suitable number of coils 5 are wound around them parallel to said revolving spindles and perpendicularly to the semi-conductor plate 3, both ends of said coils being respectively connected to two terminal members 6, 7 suitably provided on both side faces of said semi-conductor plate. In this case, the revolving spindles $4_1$, $4_2$ provided on both end surfaces of the semi-conductor plate 3 are preferably held by an appropriate pivoting means respectively, for instance, an air cushion type means which are not illustrated through terminal members 8, 9 directly secured to said semi-conductor plate, and the semi-conductor plate 3 is appropriately manufactured of elemental metal or intermetallic compound, such as indium, antimonite, etc.

Thus, when electric current (D.C.) I is passed through revolving axis $4_1$ (formed as a leading wire) of a semi-conductor held as cut perpendicularly magnetic fluxes 10 passing between both N and S poles by the pivoting means referred to above, said electric current I flows to the rotating axis $4_2$ (formed as a leading wire) through an end member 8, semi-conductor plate 3 and end member 9. In this case, a D.C. voltage $+$, $-$ is generated between the end members 6, 7 of the semi-conductor plate 3, and electric current $i$ flows in the direction of the illustrated arrow from said end member 6 to the end member 7, resulting in that, by means of magnetic flux 10 between both magnetic poles N and S and said electric current $i$ flowing through the coil, the rotor A comprising said coils and a semi-conductor plate 3 rotates around the rotating axes $4_1$ and $4_2$ with receiving a rotating force $F_2$ in the direction of an arrow illustrated.

Figure 3:
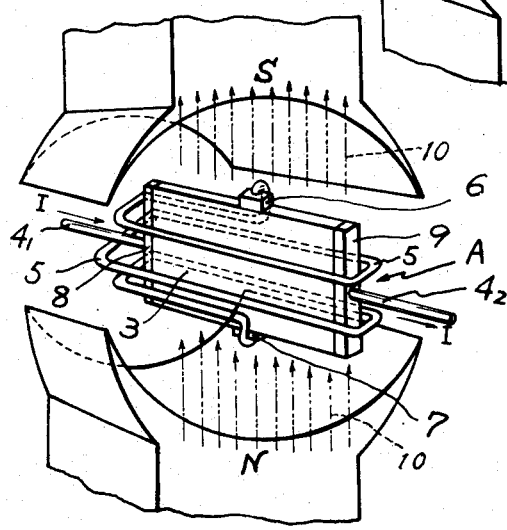

Then, when the semi-conductor plate 3 having rotated in the direction of an arrow by receiving the rotating force $F_2$ as described above comes in parallel to the magnetic flux as shown in FIGURE 3, the D.C. voltage caused by electric current I in the semi-conductor plate 3 due to said magnetic flux and rotating axes $4_1$, $4_2$ will not occur between the end members 6, 7. Thus, current $i$ does not appear in coil 5, as shown by the arrow in FIGURE 2, and the rotating force $F_2$ as similarly shown will not occur. However, in this case, as said rotating force $F_2$ generated as in FIGURE 2 have an inertia of revolution, the rotor A (comprising as described above a semi-conductor plate 3 and coil 5) further continues the rotation by means of the inertia of rotation, resulting in that semi-conductor plate 3 comes to pass through a position parallel to the magnetic flux 10, i.e. the position of 90° (see FIGURE 2) from the initial position (see FIGURE 3). Thus, electric voltage begins to occur between both end members 6 and 7 of the semi-conductor plate 3. In this case, however, the direction of electric current $i$ flows reverse to the direction of current shown in FIGURE 2, that is from the end member 7 to the end member 6. Thus, since the rotating force $F_2$ similar to that in FIGURE 2 occurs by virtue of said electric current $i$ and magnetic flux 10, the rotor A rotates further, the electric current $i$ flowing from the end member 7 to the end member 6 becomes the max. and accordingly, the rotating force $F_2$ becomes also the max. in FIGURE 4.

Thus, the rotating force $F_2$ varies from the max. to zero. Further, said rotating force occurs from said inertia of rotation and reaches to zero after passing through the max. The rotor A continues its rotation by repeating such a state, i.e. sine curves.

The foregoing description relates to the rotating electric machine according to this invention, wherein the principle of the rotating electric machine has been set forth generally with reference to FIGURES 1 through 4. In the following descriptions, its concrete construction will be described as embodiment, where the symbols employed in the said explanation are used and similar symbols are used in similar parts.

Referring to FIGURE 5, both magnetic poles N, S are wound respectively with exciting coils 20, and said semi-conductor plate 3 of a rectangle plane form is placed perpendicularly to said magnetic flux in the magnetic flux 10 between said magnetic poles, around said semi-conductor plate 3 being wound with rotating coil 5 in parallel to the direction of controlling electric current I and perpendicularly to the plane of said semi-conductor plate, and both ends of said coil being connected respectively to the end members 6 and 7. Thus, when the controlling current I is passed from the end member 8 to the end member 9 through rotating axis $4_1$, electromotive force $+$, $-$ is generated respectively on the end members 6 and 7 positioned both sides of said semi-conductor plate. Accordingly, an electric current I is caused to flow in the direction of the illustrated arrow by said E.M.F. in the rotating coil 5. As described in FIGURES 2 through 4, a rotating force $F_2$ occurs in the direction of the illustrated arrow in said current and magnetic flux 10 and rotor A comprising the semi-conductor plate 3 and rotating coil 5 is revolved around the rotating axes $4_1$ and $4_2$. In this case, as the semi-conductor plate 3 elemental metal or intermetallic compound, for instance, indium, antimonide, etc. are used. The E.M.F. generated at the end members 6 and 7 of said semi-conductor plate is at the max. when the angle between the magnetic flux 10 and the plane of said semi-conductor plate to 90°, namely the rotating force $F_2$ becomes max., while the magnetic flux 10 is parallel to the plane of semi-conductor plate 3, said semi-conductor plate is not affected by said magnetic flux. Therefore, E.M.F., accordingly, rotating force $F_2$ does not occur. For this reason, when it is used as a motor, it is not started disadvantageously as the magnetic flux 10 is parallel to the plane of semi-conductor plate 3. The rotating force $F_2$ is not proportional to the product of the magnetic flux 10 × controlling electric current I, i.e. the input.

In order to remove said disadvantages, in the present embodiment as described below, a cylinder is divided in many partitions, for instance, 4 partitions and 4 sheets of semi-conductor plate having circular section are placed at each of 4 border lines. In this case, a semi-conductor plate having an arcuate section is made of elemental metal or intermetallic compound, such as indium, antimonide, etc.

In FIGURE 6, an embodiment of the present invention is shown, wherein a cylinder (not illustrated for convenience) is divided in many, for instance, 4 partitions. In said figure, an electromagnet N, S is wound round with exciting coil 20. When said exciting coil is energized by passing electric current therethrough, magnetic flux 10 occurs between the magnetic poles N, S. Thus, for instance, an insulating plastic cylinder (not illustrated for the sake of convenience in the figure; but shown by a symbol 21 in FIGURE 7) is divided in 4 partitions, and at each corresponding position the semi-conductor plates 22, 23, 24 and 25 are distributed on the surface of said cylinder as illustrated; terminal plate members 26 and 27 of circular section are secured to both end faces respectively of those semi-conductor plates of circular section, and rotating axes $4_1$ and $4_2$ are secured to a center of a circle formed thereby. Furthermore, said semi-conductor plates 22, 24 and 23, 25 are wound round with rotating coils $28_1$ and $28_2$ in parallel with the direction of the controlling current I introduced through rotating axis $4_1$ as illustrated and parallel to the diameter formed by said two series of semi-conductor plates 22, 24 and 23, 25, simultaneously intercepting perpendicularly to the direction of rotating axes, both ends of said rotating coil being connected respectively to the end members 30, 31 and 33, 36 and furthermore to the end members 29, 32 and 34, 35. In this condition, controlling current I is introduced through rotating axis $4_1$ and said current is passed from the terminal plate member 26 to terminal plate member 27, then the E.M.F. generated at semi-conductor plate 23 is — at the end member 33 and + at the end member 34, and the E.M.F. generated at semi-conductor plate 25 is — at the end member 35 and + at the end member 36.

Thus, if semi-conductor plates 23 and 25 received max. magnetic flux 10 at the start, equal and max. electromotive forces will occur at those semi-conductor plates 23 and 25, and the end members 32 and 35 as well as the end members 34 and 36 are at equal potential, thereby two electromotive forces being generated. For instance, by virtue of the said two E.M.F. connected in series, an electric current $i$ flows through rotating coil $28_2$ wound remotely round semi-conductor plates 23 and 25 longitudinally as described above, i.e. a series circuit passing from the end member 36 through said rotating coil $28_2$ and further through end member 33, semi-conductor plate 23, end member 34, 35 and semi-conductor plate 25. Therefore, a rotating force $F_2$ is generated through said rotating coil $28_2$; and rotator A comprising an insulated plastic cylinder (not illustrated in the above figure for convenience sake; but shown by symbol 21 in FIGURE 7), four semi-conductor plates of circular section 22, 23, 24 and 25 and two sets of rotating coils $28_1$, $28_2$ rotates in the direction of the illustrated arrow around rotating axes $4_1$ and $4_2$, the E.M.F. being gradually decreased.

So far as set forth in the foregoing description, nothing has been described of the pivoting means of rotating axes $4_1$ and $4_2$. However, as described above, a suitable pivot means such as an air cushion system, etc. can be adopted for this purpose. On the other hand, the rotor A comprises semi-conductor plates 3 and coil 5 as shown in FIGURES 2 through 4, said rotor A is girdled with outer wall iron plate 37 as apparent in FIGURE 6. In the said set-up, as the electromotive force of semi-conductor plates 22, 24 is zero at the start, no electric current passes through the series circuit comprising said two semi-conductor plates 22, 24 and rotating coil $28_1$.

In the next place, as described before, the rotor A (having the set-up referred to above) commences its rotation as in FIGURE 6, and reaches to the position of 45° from the start, then the electromotive force of semi-conductor plates 23 and 25 decreases to ½ of the force at the starting. Accordingly, the rotating force $F_2$ becomes ½, while the electromotive force generated in the semi-conductor plates 22 and 24 increases gradually from zero. The end members 29, 31 assume —, memebrs 30, 32 assume + and simultaneously the electromotive force becomes max. E.M.F. of ½. Therefore, the rotating force $F_2$ of rotor A becomes ½. In this case, the total rotating force is $F_2$. When said rotor A approaches further 45° from this condition, i.e. said rotor A has already rotated 90°, the electromotive force of semi-conductor plates 23 and 25 will become zero, and accordingly, the rotating force $F_2$ will also become zero. On the contrary, the end members 30 and 32 of semi-conductor plates 22 and 24 take + and the end members 29 and 31 take —. Accordingly, E.M.F. is generated. The rotating force $F_2$ is generated along rotating coil $28_1$ and as, the rotor A continues further the rotation of more than 90°, E.M.F. reverse to that of starting is generated gradually at the end members of semi-conductor plates 23 and 25. Namely, the end members 34 and 36 take —, and the end members 33 and 35 take +. The total rotating force is this case is $F_2$. When thus magnetic flux 10 and controlling current I are constant, the rotating force $F_2$ will always be constant. Thus, as the rotating force $F_2$ is proportional to the product of the magnetic flux 10 and the controlling current I, the present device of this invention can be used in various electrical appliances.

Figure 7:
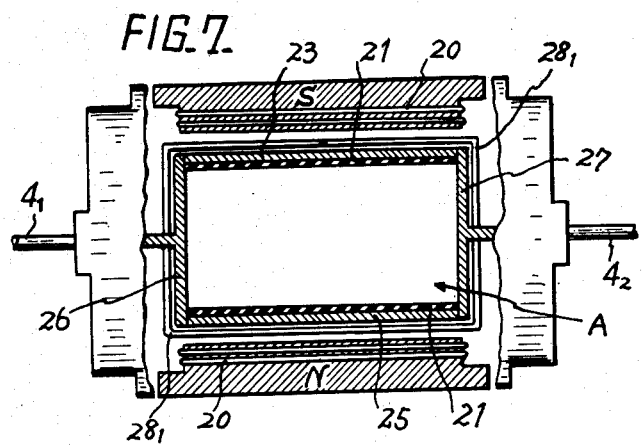
FIGURE 7 is a sectional elevation of rotating electric machine of FIGURE 6 with a part thereof being eliminated, after being cut by a plane including a substantially rotating axis thereof.
Figure 8:
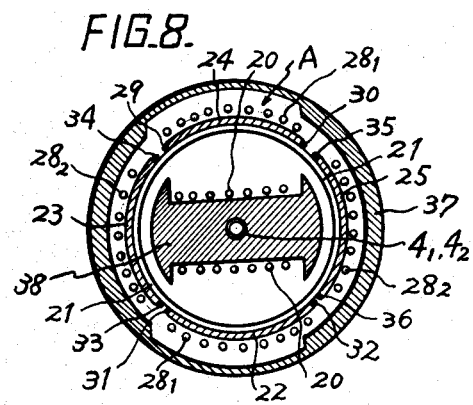
FIGURE 8 is a sectional side view illustrating another embodiment of rotating electric machine shown in FIGURE 6.
Figure 9:
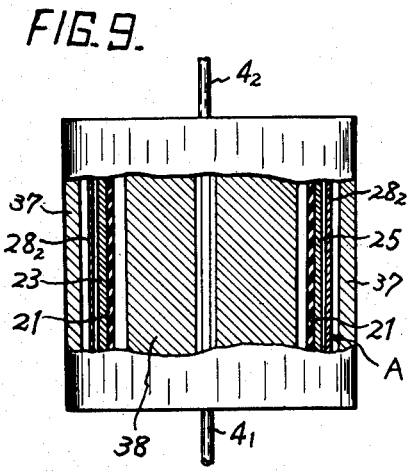
FIGURE 9 is an elevation of longitudinal section of rotating electric machine of FIGURE 8.

In FIGURES 8 and 9, the rotating electric machine according to this invention as illustrated in said FIGURES 5 through 7 is shown in another embodiment, wherein an inner stationary magnet 38 is provided in the core of rotor A in order to minimize said machine. FIGURE 8 is a sectional side elevation of the rotating electric machine according to this invention in said other embodiment, i.e. in the condition illustrated in FIGURE 6, that is, a minimized type thereof. FIGURE 9 is a longitudinal section of longitudinal elevation of FIGURE 8, with a part thereof being eliminated. In said figures, similar parts have similar symbols as in FIGURES 5 through 7.

In said two figures, the rotor A has a similar set-up as shown in FIGURES 6 and 7, i.e. comprising an insulated plastic cylinder 21, four semi-conductor plates 22, 23, 24 and 25 as well as 2 sets of rotating coils $28_1$ and $28_2$, and simultaneously said rotor A is perfectly insulated magnetically to the outer magnetic field, i.e. rotating in a space field between the inner stationary electromagnet 38 and outer wall iron plate 37, and the rotating axes $4_1$, $4_2$ are insulated from the upper axis and lower axis above said inner stationary electromagnet 38 and of course connected with the upper and lower electric current terminal plate members.

Thus, in the present electric motor, similarly as the usual mutual relationship between the electric motor and generator, the said mutual relationship is also established in the rotating electric machine according to this invention.

Namely, an inner stationary permanent magnet is used instead of said inner stationary electric magnet 38, and the rotating axes $4_1$ and $4_2$ are rotated by an external force, instead of the controlling electric current I, then the rotating coils $28_1$ and $28_2$ will cut the magnetic flux 10 to generate E.M.F. which acts on the end members 29, 30; 31, 32 and 33, 34; 35, 36 of semi-conductor plates respectively. As a result, on the terminal plate members 26, 27 provided on both end faces of respective semi-conductor plate, receiving the controlling electric current I is generated an electromotive force proportional to the rotating velocity. Accordingly it can be used as an electric generator or dynamo and also may be used as a tachometer by indicating number of rotations by means of an indicator carrying graduations for the number of rotations as converted from said E.M.F.

The foregoing description can, of course, be modified and carried out practically or used in other applications, without departing from what is defined in the following claims.

What I claim:

1. A dynamoelectric device comprising means for establishing a magnetic field; a rotor including a rotatable Hall effect plate disposed within said magnetic field; a conductive coil formed around said Hall effect plate, portions of said coil extending along a first axis of said Hall effect plate, the ends of said coil being secured to opposite edges of said Hall effect plate and disposed along a second axis of said Hall effect plate, said first and second axes being perpendicular; and rotary electroconductive supporting means secured to opposite edges of said Hall effect plate displaced along said first axis for supporting said Hall effect plate in said magnetic field.

2. A device as defined in claim 1 including means for passing a current between said rotary, electroconductive supporting means along said first axis of said Hall effect plate whereby an electromotive force is generated in said coil when said plane surface of said Hall effect device is disposed perpendicularly to said magnetic field, said current in said coil and said magnetic field reacting to rotate said Hall effect plate and said rotary supporting means secured thereto.

3. A device as defined in claim 1 including means for rotating said rotary supporting means and said Hall effect plate within said magnetic field whereby an electromotive force is induced in said coil and along said second axis and an electromotive force is generated along said first axis and in said rotary supporting means.

4. A device as defined in claim 1 wherein said magnetic field is established by a permanent magnet.

5. A device as defined in claim 1 wherein said magnetic field is established by an electromagnet.

6. A D.C. motor comprising means for establishing a magnetic field; a Hall effect plate disposed within said magnetic field; a conductor extending along a first axis of said Hall effect plate and secured at either end to opposite edges of said Hall effect plate along a second axis of said Hall effect plate; rotary electroconductive means for supporting said Hall effect plate in said magnetic field; means for passing a direct current through said Hall effect plate along said first axis whereby an electromotive force is induced in said coil when said Hall effect plate is perpendicular to said magnetic field, rotating said Hall effect plate therein, said Hall effect plate having sufficient inertia to rotate within said magnetic field until said Hall effect plate is again perpendicular to said magnetic field thereby continuously rotating.

7. A dynamoelectric device as defined in claim 1 wherein said rotor comprises a plurality of Hall effect plates of circular section and a plurality of coils secured thereto.

8. A device as defined in claim 1 wherein said rotary means are secured to said rotor by air cushion means.

References Cited in the file of this patent

UNITED STATES PATENTS 2,512,325   Hansen _____ June 20, 1950